United States Patent
Cheng et al.

(10) Patent No.: US 7,664,467 B2
(45) Date of Patent: Feb. 16, 2010

(54) METHOD FOR COORDINATED CONTROL OF RADIO RESOURCES FOR MULTICASTING IN A DISTRIBUTED WIRELESS SYSTEM

(75) Inventors: Fang-Chen Cheng, Randolph, NJ (US); Sudeep Palat, Swindon (GB); Rainer Walter Bachl, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 584 days.

(21) Appl. No.: 11/424,947

(22) Filed: Jun. 19, 2006

(65) Prior Publication Data
US 2007/0291674 A1 Dec. 20, 2007

(51) Int. Cl.
G06F 9/46 (2006.01)
H04L 12/28 (2006.01)
H04H 1/00 (2006.01)

(52) U.S. Cl. .................. 455/70; 455/452.1; 370/253; 370/254; 370/311; 370/329; 370/331; 705/26

(58) Field of Classification Search ................ 370/432, 370/312, 352, 404, 254, 253, 311, 329, 331, 370/336, 389, 395.4; 718/102; 709/227; 455/70, 452.1; 705/26
See application file for complete search history.

(56) References Cited

U.S. PATENT DOCUMENTS

| | | | | |
|---|---|---|---|---|
| 7,150,017 B1* | 12/2006 | Vogl et al. | ............. | 718/102 |
| 7,403,994 B1* | 7/2008 | Vogl et al. | ............. | 709/227 |
| 2004/0037301 A1* | 2/2004 | Shachar et al. | ............. | 370/404 |
| 2005/0058151 A1* | 3/2005 | Yeh | ............. | 370/445 |
| 2005/0152392 A1* | 7/2005 | Lim et al. | ............. | 370/432 |
| 2006/0039315 A1 | 2/2006 | Bi et al. | | |
| 2006/0104266 A1* | 5/2006 | Pelletier et al. | ............. | 370/389 |
| 2007/0147360 A1* | 6/2007 | Vogl et al. | ............. | 370/371 |
| 2007/0291674 A1* | 12/2007 | Cheng et al. | ............. | 370/312 |
| 2008/0037460 A1* | 2/2008 | Venkatachalam | ............. | 370/328 |
| 2008/0045145 A1* | 2/2008 | Nakatsugawa | ............. | 455/11.1 |
| 2008/0089265 A1* | 4/2008 | Park et al. | ............. | 370/312 |
| 2008/0101220 A1* | 5/2008 | Kim et al. | ............. | 370/229 |
| 2008/0101334 A1* | 5/2008 | Bakker et al. | ............. | 370/350 |
| 2008/0144493 A1* | 6/2008 | Yeh | ............. | 370/230 |
| 2008/0198763 A1* | 8/2008 | Fischer et al. | ............. | 370/254 |
| 2008/0253322 A1* | 10/2008 | So et al. | ............. | 370/329 |
| 2008/0259835 A1* | 10/2008 | Venkatachalam et al. | ... | 370/311 |
| 2008/0273503 A1* | 11/2008 | Lee et al. | ............. | 370/336 |
| 2008/0311926 A1* | 12/2008 | Fischer et al. | ............. | 455/452.1 |
| 2008/0317026 A1* | 12/2008 | Vogl et al. | ............. | 370/389 |
| 2008/0317037 A1* | 12/2008 | Vogl et al. | ............. | 370/395.4 |
| 2009/0010177 A1* | 1/2009 | Vogl et al. | ............. | 370/253 |

(Continued)

OTHER PUBLICATIONS

R3-060487 "Coordinated Radio Resource Management for LTE" Sophia Antipolis, France Apr. 3-Apr. 5, 2006 3GPP TSG-RAN WG3#41bis.

(Continued)

Primary Examiner—William D Cumming
(74) Attorney, Agent, or Firm—Williams, Morgan & Amerson, PC

(57) ABSTRACT

A method for coordinating control of radio resources for multicast/broadcast services in distributed radio resource management. The method includes communicating information between a plurality of units having radio resource management responsibilities. The communicated information is related to coordinating at least one multicast/broadcast service provided by the plurality of units.

18 Claims, 4 Drawing Sheets

U.S. PATENT DOCUMENTS

2009/0011718 A1* 1/2009 Chun et al. .................. 455/70
2009/0012876 A1* 1/2009 Vogl et al. .................. 705/26
2009/0040982 A1* 2/2009 Ho et al. .................. 370/331

OTHER PUBLICATIONS

R1-060711 "Text Proposal for TR 25.814, section 9.1.2.7" Denver, CO, USA, Feb. 13-Feb. 17, 2006 TSG RAN WGI #44.

R3-060663 "Signaling Requirements for Inter-cell RRM" Shanghai, China, May 8-May 12, 2006 3GPP TSG RAN WG 3 Meeting #50.

R3-060085 "LS on RRM for LTE" Sophia Antipolis, France, Jan. 10-Jan. 12, 2006 TSG RAN WG3 Meeting #50.

R1-060719 "LS Answer to R3-0600085 (=R1-060004) on RRM for LTE" Denver, CO, USA Feb. 13-Feb. 17, 2006 3GPP TSG RAN WG3 Meeting #51.

R3-060262 "Handling of Ping-Pong in LTE Architectures" Denver, CO., USA, Feb. 13-Feb. 17, 2006 3GPP TSG RAN WG3 #51.

R3-060369 "Open Issues; Competing RRM decision points in LTE Architectures" Denver, CO., USA Feb. 13-Feb. 17, 2006 3GPP TSG RAN WG3#51.

R3-060052 "RRM Distribution in LTE Architecture" Sophia Antipolis, France, Jan. 10, 2006-Jan. 12, 2006 3GPP TSG RAN WG3 Meeting #50.

R3-060190 "Nortel Proposal for LTE RRM" Denver, CO., USA, Feb. 13-Feb. 17, 2006 3GPP TSG RAN3 Meeting #51.

R3-060264 "RRM & LTE Architecture" Denver, CO., USA, Feb. 13-Feb. 17, 2006 3GPP TSG RAN WG3 Meeting #51.

R1-060711 "Text Proposal for TR25.814, Section 9.1.2.7" Denver, CO., USA Feb. 13-Feb. 17, 2006 TSG RAN WGI #44.

R1-060712 "Text Proposal for TR25.814, Section 7.1.2.6" Denver, CO., USA Feb. 13-Feb. 17, 2006 TSG RAN WG1#44.

* cited by examiner

METHOD FOR COORDINATED CONTROL OF RADIO RESOURCES FOR MULTICASTING IN A DISTRIBUTED WIRELESS SYSTEM

BACKGROUND OF THE INVENTION

1. Field of the Invention

This invention relates generally to communication systems, and, more particularly, to wireless communication systems.

2. Description of the Related Art

In the field of wireless telecommunications, such as cellular telephony, a typical system 100, as shown in FIG. 1, is a hierarchical architecture and includes a plurality of base stations 130 (e.g., Node Bs) distributed within an area to be serviced by the system. Various access terminals 120 (ATs, also known as User Equipment (UE), mobile devices, and the like) within the area may then access the system and, thus, other interconnected telecommunications systems, such as a publicly switched telephone system (PSTN) 160 and a Data network 125, via one or more of the base stations 130. Typically, an AT 120 maintains communications with the system 100 as it passes through an area by communicating with one and then another base station 130, as the AT 120 moves. The AT 120 may communicate with the closest base station 130, the base station 130 with the strongest signal, the base station 130 with a capacity sufficient to accept communications, etc. The base stations 130, in turn, communicate with a Radio Network Controller (RNC) 138, which communicates with a Packet Data Serving Node (PDSN) 164 in a core network 165. Each RNC 138 and PDSN 164 is capable of supporting a plurality of base stations 130. Thus, as an AT 120 moves and communicates with different base stations 130, it may also communicate with different RNCs 138 and PDSNs 164.

The wireless link between the ATs 120 and the Base Stations 120 is typically referred to as the radio link, and in systems such as the Universal Mobile Telephone System (UMTS), much of the coordination of the radio link is handled by the RNCs 138 in a relatively centralized manner. For example, hand-offs of the ATs 120 from one base station 130 to another is determined by the RNCs 138. Similarly, owing to their proximity to one another, the base stations 120 can generate signals that interfere with one another. In some applications, the RNCs 138 control the transmissions of the various base stations 130 to reduce or minimize this type of interference.

However, the industry intends for UMTS to evolve away from the use of RNCs 138 with a distributed Radio Resource Management (RRM) architecture. The complexity of hand-offs and interference mitigation increases in the distributed RRM architecture, as the RRM functions are located at different physical locations. Moreover, the conventional distributed RRM architecture may not permit coordination of multiple node-Bs during multicast/broadcast transmissions, e.g. transmissions according to Multimedia Broadcast Multicast Service (MBMS) Thus, conventional distributed RRM architectures may not achieve the well known advantages of macro diversity combining of signals from different node-Bs at each mobile unit that receives the multicast/broadcast transmission.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for coordinating control of radio resources for multicast/broadcast services in distributed radio resource management. One exemplary embodiment of the method may include communicating information between a plurality of units having radio resource management responsibilities. The communicated information is related to coordinating at least one multicast/broadcast service provided by the plurality of units.

BRIEF DESCRIPTION OF THE DRAWINGS

The invention may be understood by reference to the following description taken in conjunction with the accompanying drawings, in which like reference numerals identify like elements, and in which.

Figure 1:
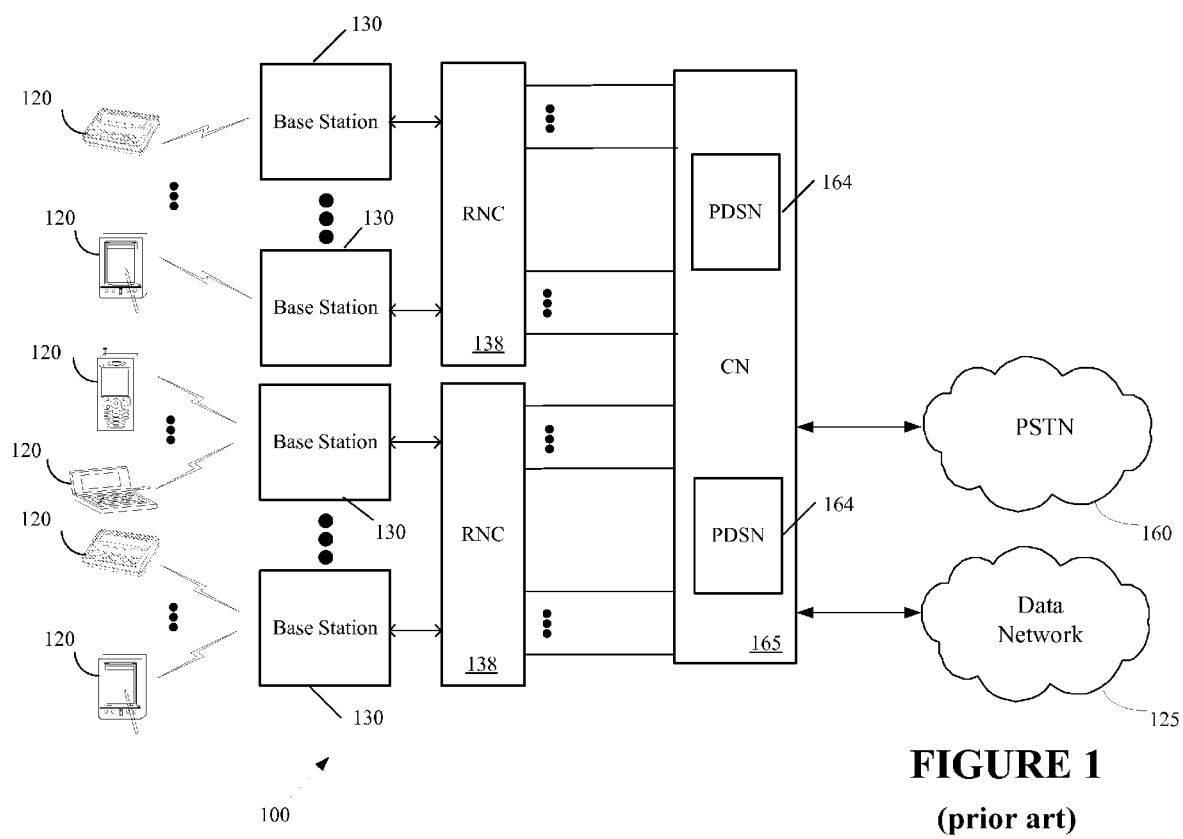
FIG. 1 is a block diagram of a prior art communications system, such as a Universal Mobile Telephone System (UMTS) in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
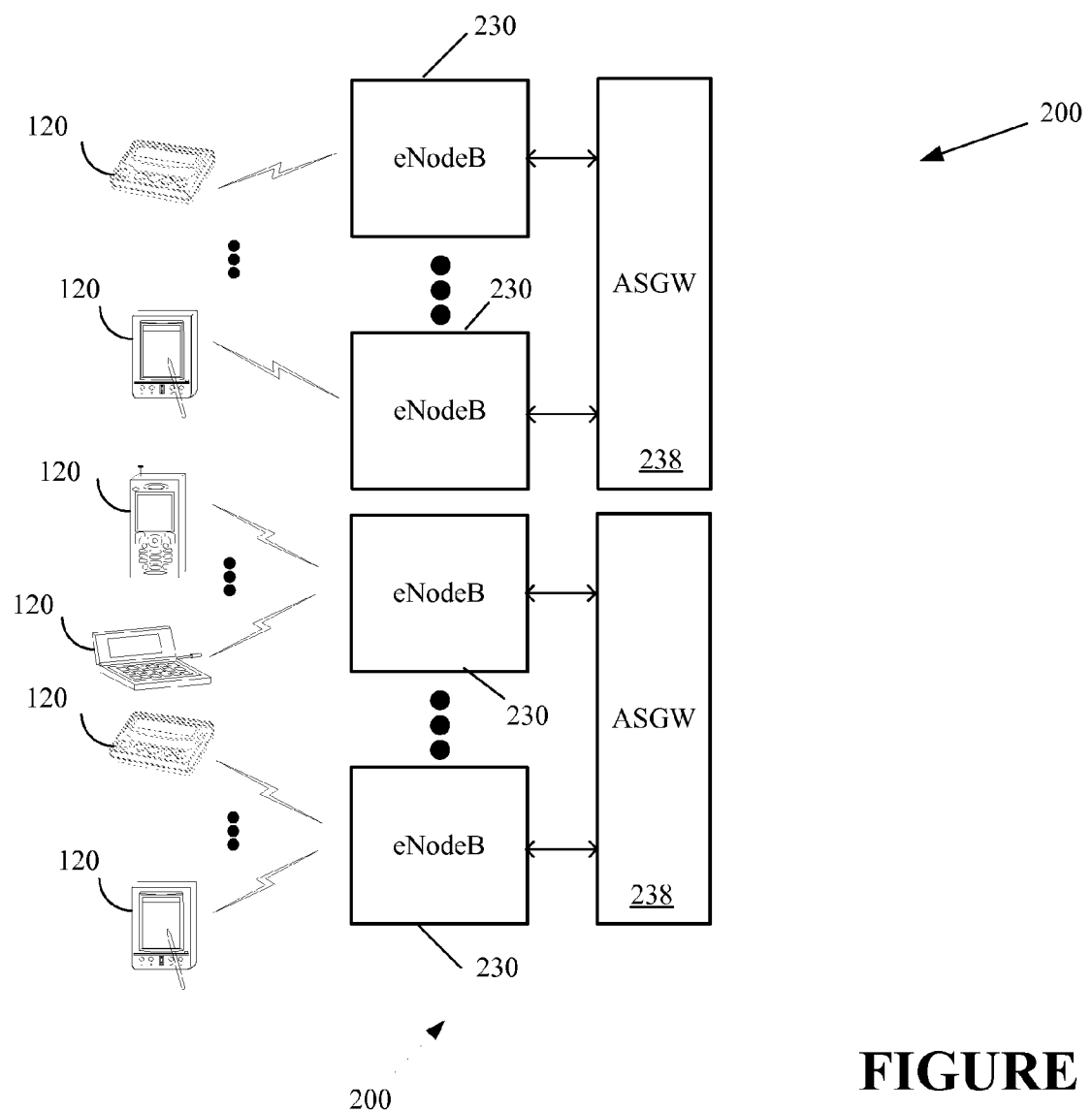
FIGS. 2A and 2B are block diagrams of a portion of a communications system, such as a Long Term Evolution (LTE) UMTS in which the present invention may find application.

Turning now to the drawings, and specifically referring to FIG. 2A, a communications system 200 is illustrated, in accordance with one embodiment of the present invention. For illustrative purposes, the communications system 200 of FIG. 2 is a Universal Mobile Telephone System (UMTS) Long Term Evolution (LTE), although it should be understood that the present invention may be applicable to other systems that support data and/or voice communication. The UMTS LTE system 200 has some similarities to the UMTS system 100 of FIG. 1, but differs substantially with respect to the operation of the instant invention with regard to the base stations 130 and RNCs 138. The communications system 200 allows one or more access terminals (ATs) 120 to communicate with one or more enhanced Node Bs (eNodeB) 230, which are coupled to access gateways (ASGW) 238. The ASGW 238 is then responsible for communications with the PSTN 160 and/or Data Network 125 (see FIG. 1). Functionally, the communications system 200 differs from the communications system 100 from at least the standpoint of radio resource management RRM. In the communications system 100, the RRM was primarily effected by the RNC 138. In the communications system 200, however, the RRM functionality has been distributed to the eNodeBs 230.

A coordinated RRM scheme defines the mechanism for joint radio resource management and performance optimization among cells when the RRM functions are distributed and minimal signaling delay is required in the LTE. The coordinated RRM scheme enables coordination among different RRM functions to perform the handover procedure and interference coordination technology at the same time in the distributed RRM structure. A coordinated RRM scheme for the communications system 200 may be useful in at least three instances. First, to reduce interference caused by transmissions of adjacent or nearby eNodeBs 230, second, during hand-offs of the ATs 120 from one eNodeB 230 to another, and third, to coordinate provision of multicast/broadcast services provided to one or more of the ATs 120 by the communication system 200.

Multi-cell RRM decisions, such as load-based handover and interference coordination reconfiguration during handover are useful features in the UMTS LTE architecture. Making RRM decisions based on multiples cells would benefit the overall resource allocation and system performance. However, it is often beneficial to avoid the potential competing RRM decisions when multiple cells are considered. The potential issue of the competing RRM points could be avoided by coordinating the RRM decision among the RRM functions, which is one of the objectives in the proposed coordinated RRM scheme.

The coordinated RRM scheme defines the inter-RRM communication protocol, radio resource elements and functions for joint management, and the decision function for joint radio resource management. The defined functions in the coordinated RRM scheme would allow the system to perform the resource management jointly in a cluster and to avoid or at least substantially reduce any competing decision among RRM functions. The coordinated RRM schemes perform coordination of possibly multi-vendor RRM in a cluster without specifying the actual RRM algorithm running at each distributed node.

One function of the coordinated RRM scheme involves establishing a protocol for inter-RRM communication. The RRM functions in the hierarchical network structure (such as the conventional system depicted in FIG. 1) are usually in a centralized location (e.g., RNC) with distributed sub-functions in the distributed nodes (e.g., Power management in HSDPA in the base station) in UMTS. The inter-RRM communication is a client-server, one-to-one communication between the base station and the RNC. The majority of the RRM functions are located in the RNC. However, since the majority of the RRM functions envisioned in UMTS LTE are located at the eNodeB 230, the inter-RRM communication may be a distributed protocol design with multiple capabilities. The inter-RRM communication protocol in the UMTS LTE may support peer-to-peer, one-to-many, and broadcast communication.

The peer-to-peer communication allows inter-RRM communications that involve direct negotiation between two eNodeBs 230 in a cluster without going through a centralized node (RRM server or RNC). The peer-to-peer communication capability would reduce the process delay and jointly optimize the system resource control. A typical example of peer-to-peer RRM communication is the handover between two eNodeBs 230. The direct RRM communication between two eNodeBs 230 would expedite the handover process and reduce the potential performance degradation during handover. One-to-one communications may also be used to negotiate or communicate radio resource allocation strategies for providing multicast/broadcast services, as will be discussed in detail below.

The one-to-many communications capability enables the eNodeB 230 to have inter-RRM negotiation with many other nodes at the same time. The one-to-many RRM communication may be used to minimize the probability of competing decisions among the nodes with relationship to radio resource management. A typical example of one-to-many RRM communication is the resource allocation for the user mobility. The initial trigger of the handover request would involve multiple eNodeBs 230 and the ASGW 238. The one-to-many inter-RRM communication would allow the serving eNodeB 230 to trigger the handover request directly to all nodes involved at the same time. Another example of one-to-many communications occurs when eNodeBs 230 negotiate or communicate radio resource allocation strategies for providing multicast/broadcast services, as will be discussed in detail below.

The broadcast communications capability enables the eNodeB 230 to broadcast a request of the reconfiguration parameters to other RRM functions in the cluster at the same time. The broadcast capability allows the RRM to trigger a request immediately to other RRMs in the cluster for any configuration change. The typical example of broadcast capability in the inter-RRM communication protocol is the reconfiguration of the interference mitigation scheme when one RRM detects an abnormal condition or severe degradations of the on-going interference mitigation scheme. The broadcast capability may also be used to trigger reconfiguration of radio resource allocation strategies for providing multicast/broadcast services in response to a re-configuration request from an AT 120, as will be discussed in detail below.

The inter-RRM communication may specify the entities required for the joint radio resource optimization. The RRM entities may be pre-configured or request on demand between RRM without specifying the exact RRM algorithm in each node. The radio resource entities could be the frequency chunk, interference level, cell load, radio bearer, measurement, etc. The radio resource entities are defined to assist the RRM function to manage its own resource with radio information from other cells.

A decision function may also be implemented in the system 200. The decision function is an algorithm to independently calculate the values or statistics based on the received RRM entities for the decision making of the radio resource configuration and control. The decision function may be independent of the RRM algorithm for inter-vendor RRM communication. The decision function may be specified to trigger the radio resource reconfiguration or reallocation. A general example of the decision function is the threshold function for the handover. The decision function could be specified with the threshold value of triggering the handover being sent between the eNodeBs 230 during the handover process. Once the inter-RRM communication protocol, the Radio resource entities and decision functions are specified clearly, the RRM function of each individual node may be developed independently based on the inter-cell RRM coordination. This may help optimize the overall radio resource utilization.

The coordinated RRM scheme is useful to provide the inter-RRM communication for coordinating distributed RRM functions to support the interference mitigation technology during the handover in LTE. The RRM functions for the interference mitigation technology are located at the eNodeB 230 and require the coordination of the radio resource in static, semi-static, or dynamic fashion among the cells in the UMTS LTE to mitigate the interference level for the cell edge users. The interference mitigation may be reconfigured when the system load is changing dynamically or in situations with load imbalances. The system load is changing dynamically when handovers take place. The interference mitigation is also sensitive to the dynamics of the cell edge load. The RRM functions that handle the interference mitigation technology may communicate with other cells' RRM or RRM server to reconfigure the interference mitigation parameters without explicitly specifying the RRM and interference coordination algorithms in the eNodeB 230. During the handover period, the RRM for the mobility management and the handover procedure handling is performed and its location is at the central node or handshaking between the serving and target base stations. The defined inter-RRM communication protocol, radio resource entities, and decision functions in the coordinated RRM scheme enable interaction among distributed RRM functions to perform the interference coordination algorithm and handover procedure at the same time. The coordinated RRM scheme enables the interference mitigation scheme to trigger the redistribution of the radio resources among cells when the handover procedure takes place and results in unbalanced system loads.

The coordinated RRM scheme may also be used to coordinate provision of multicast/broadcast services from the eNodeBs 230 to the ATs 120. In one embodiment, the coordinated RRM scheme allows multiple eNodeBs 230 to provide multicast/broadcast services substantially simultaneously to one or more of the ATs 120. For example, the eNodeBs 230 may negotiate radio resource allocation strategies for the multicast/broadcast services, as will be discussed in detail below. Consequently, the ATs 120 may take advantage of macro diversity combining to enhance the quality of the multicast/broadcast service. In various alternative embodiments, macro diversity combining from multiple eNodeBs 230 could be achieved inherently as combining over the air or may be implemented by explicit processing in the ATs 120. As used herein, the term "substantially simultaneously" will be understood to mean that the multicast/broadcast services are synchronized to the extent that macro diversity combining may be implemented. However, persons of ordinary skill in the art having benefit of the present disclosure should appreciate that the signals may not be (and may not need to be) exactly simultaneous to achieve some or all of the advantages of macro diversity combining. Techniques for implementing macro diversity combining are known in the art and in the interest of clarity only those aspects of macro diversity combining that are relevant to the present invention will be discussed herein.

Figure 2B:
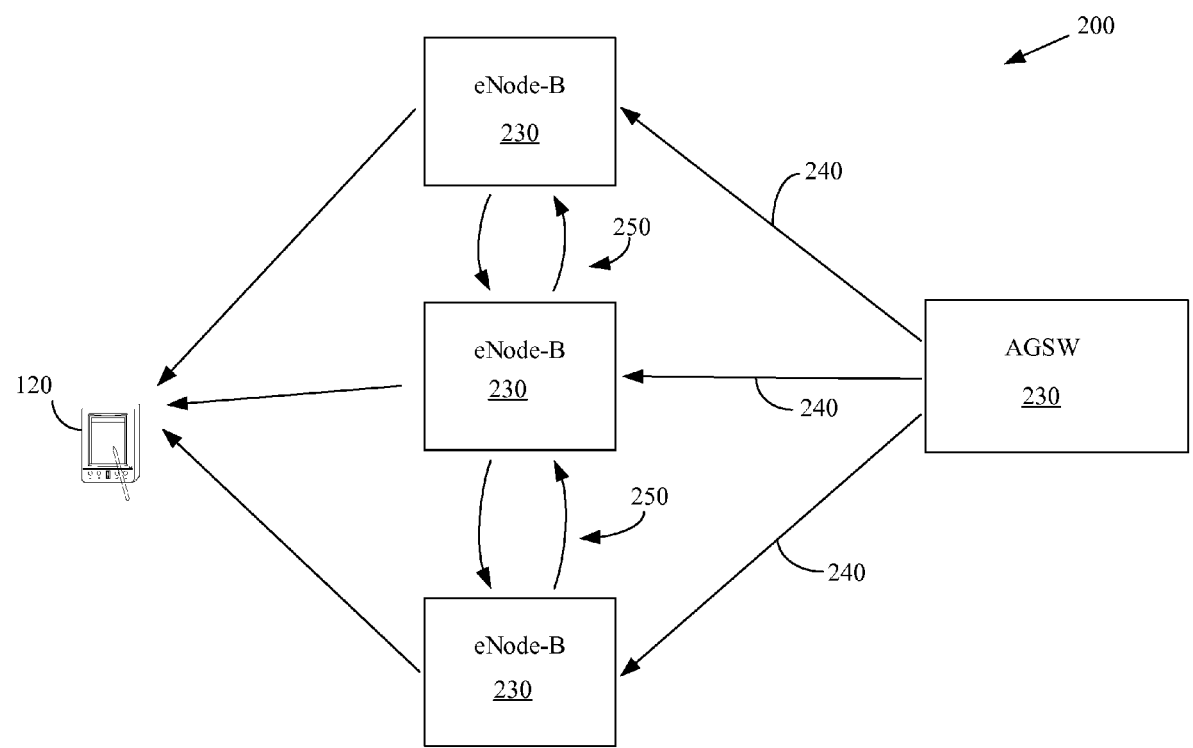

Generally, referring to FIG. 2B, each eNodeB 230 or ASGW 238 may communicate to coordinate provision of multicast/broadcast services to the AT 120. Communications and/or negotiations between the eNodeBs 230 and/or the ASGW 238 may be performed using the resource management protocols discussed above. In one embodiment, multicast/broadcast services provided by the communication system 200 may include global broadcasting and local broadcast/multicast services. Global broadcasting services may be provided substantially continuously using all or most of the eNodeBs 230 in the communication system 200. For example, global broadcasting services may be used to broadcast heavily used multicast/broadcast services such as 24-hour news services. Local broadcast/multicast services may be provided by request using a subset or cluster of the eNodeBs 230 in the communication system 200. For example, local broadcast/multicast services may be used to provide less popular niche services (or services that are provided during a limited time period such as pay-per-view events) to individual users or small groups of users.

A radio resource allocation strategy may be provisioned to the eNodeBs 230 by the ASGW 238, as indicated by the arrows 240. The provisioned radio resource allocation strategy may include information indicating one or more resource blocks and/or how these resource blocks should be allocated for providing the broadcast/multicast services. The provisioned radio resource allocation strategy may also include information indicating a modulation and coding selection (MCS) for the multicast/broadcast services, a scheduling time for the multicast/broadcast services, a scheduling interval during which the multicast/broadcast services are provided, and a data rate for providing the multicast/broadcast services. In one embodiment, the radio resource allocation strategy that is provisioned to the eNodeBs 230 by the ASGW 238 is a global radio resource allocation strategy for providing global broadcast/multicast services. The global radio resource allocation strategy may be pre-provisioned to the eNodeBs 230 at system initialization. Once the global radio resource allocation strategy has been provisioned, and the global multicasting service has been triggered and configured, the coordinated scheduling strategies may allow automatic radio resource allocation without any handshaking between the eNodeBs 230 and/or the ASGW 238.

The eNodeBs 230 may also coordinate and/or negotiate radio resource allocation strategies between themselves and a centralized control node, such as a User Plane Entity (UPE) function implemented in the ASGW 238, being considered as one of the nodes. In one embodiment, a coordinated RRM scheme attempts to jointly optimize the cluster radio resource control by coordinating the decision of distributed RRM functions in a cluster of eNodeBs 230. The scheduling strategies are communicated among e-NodeBs 230 and ASGW 238 for multicast/broadcast routing through the protocol for inter-RRM communication for multicast/broadcast (e.g., e-MBMS) services. The scheduling coordination may be achieved by defining the radio resource allocation strategies, such as resource blocks and allocations in Orthogonal Frequency Division Multiple Access (OFDMA) systems, modulation and coding selections (MCS), scheduling time, scheduling interval and the associated data rate, for each multicast/broadcast service. In one embodiment, the radio resource allocation strategies may be pre-defined during initialization of each multicast/broadcast service and each multicast/broadcast service may have an associated multicast/broadcast service identifier (e.g., an e-MBMS ID). Each multicast/broadcast service could contain a set of data rates associated with each predefined resource block allocation.

The eNodeBs 230 exchange information (as indicated by the arrows 250) that may be used to coordinate, negotiate, and/or agree on a common radio resource allocation strategy. In the illustrated embodiment, the scheduling strategies are negotiated among the involved e-NodeBs 230 (such as the eNodeBs 230 in a group or cluster that are providing multicast/broadcast services) through inter-RRM communication protocol using one-to-one communications, one-to-many communications, broadcast communications, and the like. Once the strategies are agreed, a scheduler (not shown) implemented in each of the e-NodeBs 230 in the cluster or group may allocate the pre-configured radio resource blocks based on the data rate at given time and duty cycle to the given multicast/broadcast service, e.g. a multicast/broadcast service indicated by an e-MBMS ID (identification). The eNodeBs 230 may then use the negotiated radio resource allocation strategy to coordinate provision of the multicast/broadcast services in a manner that permits macro diversity combining. For example, in the case of eNodeBs 230 that provide LTE e-MBMS services, the substantially synchronized scheduled transmission among e-NodeBs 230 would have macro diversity combining reception at the AT 120 for optimal e-MBMS performance.

In one embodiment, the allocated radio resources may be used for other purposes if no multicast/broadcast services have been requested. For example, if no e-MBMS data arrives at the pre-configured time, the pre-allocated resource blocks may be released for unicast data service. At least in part to facilitate allocation and/or reallocation of the radio resources before they are needed, multicast/broadcast service data may be routed by the UPE to e-NodeBs 230 in the cluster or group in advance of the scheduled or allocated transmission time or time interval to prevent excessive e-UTRA delay.

The system 200 may also provide and coordinate multiple multicast/broadcast services. In one embodiment, multiple e-MBMS services are coordinated to be served using time division multiplexing to avoid contention for the radio resources among the multiple e-MBMS services. For example, the e-NodeBs 230 may be allocated to each e-MBMS service at a different transmission time interval (TTI) between duty cycles to avoid resource contention between the different multicast/broadcast services. Multiple e-MBMS services may also be coordinated to be served using dynamic assignment from a pool of radio resource based on the data arrival. For example, radio resources may be dynamically assigned to e-MBMS services based on a radio resource allocation strategy, which may be pre-defined or negotiated during operation.

Figure 3:
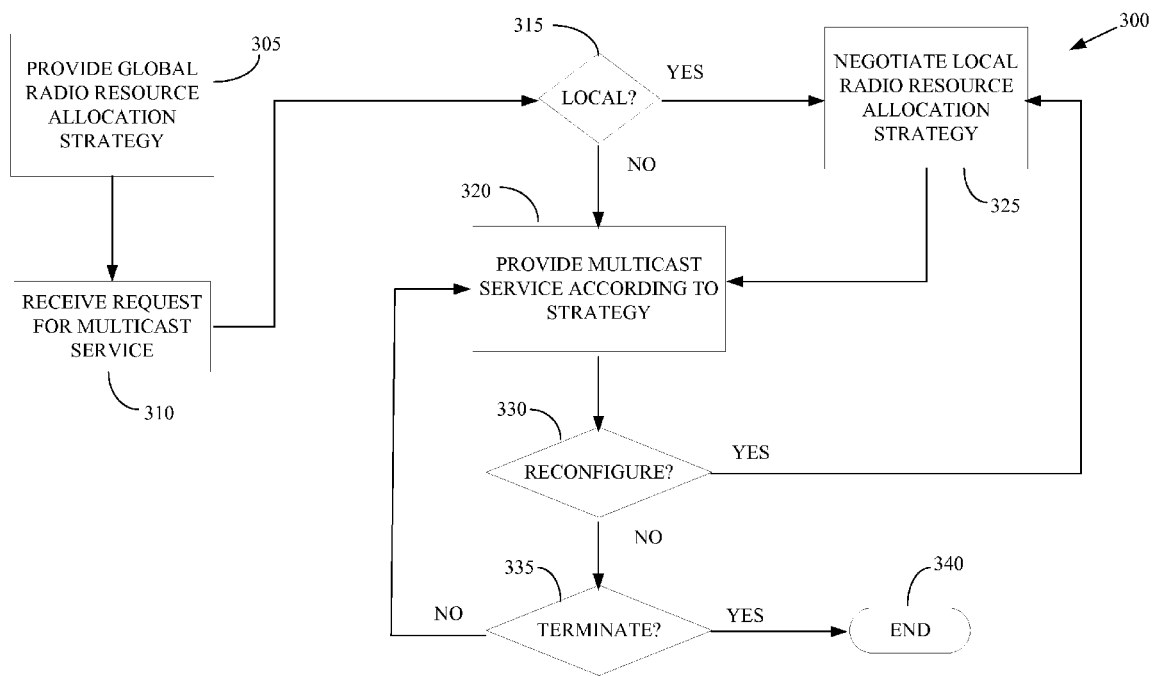
FIG. 3 is one embodiment of a flow chart representation of a method that may be used to coordinate radio resources for multicast/broadcast services, in accordance with the present invention.

FIG. 3 is one embodiment of a flow chart representation of a method 300 that may be used to coordinate radio resources for multicast/broadcast services. In the illustrated embodiment, a global radio resource allocation strategy may be provided or provisioned (at 305). For example, the global radio resource allocation strategy may be provided to all of the cells within a particular network. A pre-defined radio resource allocation strategy may also be established between the eNodeBs as part of the pre-provisioning process. By pre-provisioning (at 305) the global radio resource allocation strategy, the lengthy and inefficient handshaking process that would be necessary to provide a global multicast/broadcast service may be eliminated. However, persons of ordinary skill in the art having benefit of the present disclosure should appreciate that pre-provisioning (at 305) a radio resource allocation strategy is not necessary for the practice of the present invention.

A request for a broadcast/multicast service may then be received (at 310). In one embodiment, the request for the multicast/broadcast service is received from an access terminal, which may be a member of a cluster or a group that may receive the multicast/broadcast service in response to the request. The system may then determine (at 315) whether or not the request of multicast/broadcast service is a local service or a global service. If the requested multicast/broadcast service is not a local service, then the multicast/broadcast service may be provided (at 320) according to the pre-provisioned global radio resource allocation strategy. In one embodiment, the e-NodeBs may acknowledge reception and/or acceptance of the global radio resource allocation strategy.

If the requested multicast/broadcast service is a local service, one or more eNodeBs may negotiate (at 325) a local radio resource allocation strategy before providing (at 320) the multicast/broadcast service according to the negotiated strategy. For example, if any e-NodeB receives an e-MBMS service request from an access terminal, the eNodeB may trigger the inter-RRM coordination protocol. If the requested e-MBMS service exists in the cluster, the access terminal may be added to the user group of the e-MBMS service during the call setup. The mobility management function at a Mobility Management Entity (MME) tracks the access terminal by assigning an associated e-MBMS ID. If the requested e-MBMS service is a new service, the e-NodeB sends one or more scheduling coordination messages to all e-NodeBs in the cluster to set up the new e-MBMS service. In alternative embodiments, the resource strategy allocation procedures may or may not include the exchange of acknowledgements between the various e-NodeBs.

The radio resource allocation strategies may also be modified or re-configured. In the illustrated embodiment, access terminals may provide reconfiguration requests. The radio resource allocation strategies may then be renegotiated (at 325) if a reconfiguration request is received (at 330). Multicast/broadcast services may be provided (at 320) according to the renegotiated strategy. For example, the reconfiguration may be triggered if an access terminal sends a request for e-MBMS service re-configuration request. The e-NodeB receives the reconfiguration request and sends the RRM coordination messages to all e-NodeBs for reconfiguration. The RRM coordination message(s) may be sent as peer-to-peer communications, one-to-many communications, or broadcasts.

Multicast/broadcast services that are being provided to one or more access terminals may be terminated if a termination message is received (at 335). For example, an e-NodeB may send out an RRM coordination message to terminate the e-MBMS service if a serve-termination-request, or any other message indicating that the access terminal requests termination of the multicast/broadcast service, is received from an access terminal or the access terminal moves out of a service area associated with the multicast/broadcast service. The eNodeBs may the use scheduling coordination messages and/or algorithms to remove the access terminal from its multicast/broadcast service user group if there are other users in the group. If no other user is currently in the user group, the scheduling coordination may also remove the pre-configured scheduling strategies and its associated resource through inter-RRM communication. The method 300 may then end (at 340).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for coordinating multicast/broadcast services in distributed radio resource management, comprising:

communicating, between a first base station and at least one second base station, information used to negotiate a radio resource management strategy to be used by the first base station and said at least one second base station, to provide at least one of a multicast service and a broadcast service to at least one access terminal, wherein said at least one access terminal is subscribed to said at least one multicast service or broadcast service.

2. The method of claim 1, wherein communicating the information between the units comprises communicating information used to synchronize transmissions from the first base station with transmissions from said at least one second base station so that said at least one access terminal can combine the transmissions from the first base station and said at least one second base station to achieve macro diversity enhancement of said at least one multicast service or broadcast service.

3. The method of claim 2, wherein communicating the synchronization information comprises negotiating the radio resource allocation strategy to determine at least one of a resource block, an allocation of the resource block, a modulation and coding selection, a scheduling time, a scheduling interval, and a data rate to be used by the first base station and said at least one second base station.

4. The method of claim 3, comprising negotiating said at least one radio resource allocation strategy between the first base station and said at least one second base station using at least one of a one-to-one communication, one-to-many communication, or broadcast communication.

5. The method of claim 4, wherein negotiating said at least one radio resource comprises negotiating said at least one radio resource with or without acknowledgements between the first base station and said at least one second base station.

6. The method of claim 1, comprising providing at least one global radio resource allocation strategy from a gateway to the first base station and said at least one second base station, and wherein communicating the information used to negotiate the radio resource allocation strategy comprises communicating information used to negotiate the radio resource allocation strategy based on said at least one global radio resource allocation strategy, the information being communicated between the first base station and said at least one second base station without communicating with the gateway.

7. The method of claim 6, further comprising establishing a pre-defined radio resource allocation policy between the first base station and said at least one second base station.

8. The method of claim 1, comprising providing said at least one broadcast or multicast service using the first base station and said at least one second base station.

9. The method of claim 8, wherein providing said at least one multicast or broadcast service comprises providing said at least one broadcast or multicast service in response to receiving a service request from said at least one access terminal.

10. The method of claim 9, wherein communicating the information between the first base station and said at least one second base station comprises communicating the information between the first base station and said at least one second base station in response to receiving the service request.

11. The method of claim 10, wherein communicating the information between the first base station and said at least one second base station comprises negotiating at least one radio resource allocation strategy between the first base station and said at least one second base station in response to receiving the service request.

12. The method of claim 11, comprising renegotiating said at least one radio resource allocation strategy in response to receiving a service re-configuration request from said at least one access terminal.

13. The method of claim 12, comprising terminating said at least one multicast service in response to receiving a termination request from said at least one access terminal.

14. The method of claim 13, comprising de-allocating resources indicated by said at least one radio resource allocation strategy in response to terminating said at least one multicast service.

15. The method of claim 8, wherein providing said at least one multicast or broadcast service comprises providing a plurality of multicast or broadcast services.

16. The method of claim 15, wherein providing the plurality of multicast or broadcast services comprises coordinating the plurality of multicast or broadcast services to avoid radio resource contention between the plurality of multicast or broadcast services.

17. The method of claim 15, wherein coordinating the plurality of multicast services comprises allocating each of the plurality of multicast or broadcast services to different transmission time intervals.

18. The method of claim 15, wherein coordinating the plurality of multicast services comprises allocating the each of the plurality of multicast or broadcast services dynamically from a pool of radio resource.

* * * * *

UNITED STATES PATENT AND TRADEMARK OFFICE
CERTIFICATE OF CORRECTION

PATENT NO.      : 7,664,467 B2                                              Page 1 of 1
APPLICATION NO. : 11/424947
DATED           : February 16, 2010
INVENTOR(S)     : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Fourth Day of January, 2011

David J. Kappos
*Director of the United States Patent and Trademark Office*